US012166652B2

(12) United States Patent
Vaishnavi

(10) Patent No.: US 12,166,652 B2
(45) Date of Patent: Dec. 10, 2024

(54) METHOD AND APPARATUS INCLUDING RECURSIVE CLOSED LOOP GOAL TRANSLATION AND CONFIGURATION

(71) Applicant: Lenovo (Singapore) Pte. Ltd., New Tech Park (SG)

(72) Inventor: Ishan Vaishnavi, Munich (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/277,570

(22) PCT Filed: Feb. 17, 2022

(86) PCT No.: PCT/US2022/016728
§ 371 (c)(1),
(2) Date: Aug. 16, 2023

(87) PCT Pub. No.: WO2022/178082
PCT Pub. Date: Aug. 25, 2022

(65) Prior Publication Data
US 2024/0137299 A1   Apr. 25, 2024
US 2024/0235971 A9   Jul. 11, 2024

Related U.S. Application Data

(60) Provisional application No. 63/150,530, filed on Feb. 17, 2021.

(51) Int. Cl.
*H04L 41/0816* (2022.01)
*H04L 41/08* (2022.01)
*H04L 43/08* (2022.01)

(52) U.S. Cl.
CPC ................................. *H04L 43/08* (2013.01)

(58) Field of Classification Search
CPC ...... H04L 43/08; H04L 41/08; H04L 41/0816
(Continued)

(56) References Cited

U.S. PATENT DOCUMENTS

| | | | |
|---|---|---|---|
| 11,556,357 B1* | 1/2023 | Ghosh | G06F 9/44578 |
| 2009/0249128 A1* | 10/2009 | Heckman | G06F 11/008 |
| | | | 714/E11.179 |

(Continued)

OTHER PUBLICATIONS

PCT International Search Report for PCT/US2022/016728, Ishan Vaishnavi, (SMM920200250-WO-PCT), mailing date - May 19, 2022.

(Continued)

*Primary Examiner* — Jude Jean Gilles
(74) *Attorney, Agent, or Firm* — FIG. 1 Patents

(57) ABSTRACT

A method and apparatus are provided, in which an execution of at least one managed entity operating within a network is con-trolled by a management entity. The management entity includes a controller adapted for establishing (1302) a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity. The controller is further adapted for identifying (1304) a translation for each of the at least one of the one or more associated criteria that can not be directly determined using one or more different criteria that can be directly determined by the management entity.

20 Claims, 11 Drawing Sheets

(58) Field of Classification Search
USPC ........................................................ 709/224
See application file for complete search history.

(56) References Cited

U.S. PATENT DOCUMENTS

| | | | | |
|---|---|---|---|---|
| 2017/0279647 | A1* | 9/2017 | Yang | ..................... H04L 5/0053 |
| 2019/0281466 | A1* | 9/2019 | Zhang | ..................... H04L 41/12 |
| 2022/0165343 | A1* | 5/2022 | Jung | ................... G11C 11/5628 |

OTHER PUBLICATIONS

3GPP TS 28.535 V17.0.0 (Dec. 2020), 3rd Generation Partnership Project; Technical Specification Group Services and System Aspects; Management and Orchestration; Management Services for Communication Service Assurance; Requirements (Release 17).
3GPP TS 28.536 V16.0.0 (Jul. 2020), 3rd Generation Partnership Project; Technical Specification Group Services and System Aspects; Management and Orchestration; Management Services for Communication Service Assurance; Stage 2 and Stage 3 (Release 16).
ETSI GS ZSM-009-2 V0.3.1 (Jul. 2020), Zero-Touch Network and Service Management (ZSM); Closed-Loop Automation; Solutions.
ETSI GS ZSM-009-1 V0.8.5 (Aug. 2020), Zero-Touch Network and Service Management (ZSM); Closed-Loop Automation; Enablers.
3GPP TS 28.532 V16.6.0 (Dec. 2020), 3rd Generation Partnership Project; Technical Specification Group Services and System Aspects; Management and Orchestration; Generic Management Services; Requirements (Release 16).
3GPP TS 28.536 V16.2.1 (Jun. 2021), 3rd Generation Partnership Project; Technical Specification Group Services and System Aspects; Management and Orchestration; Management Services for Communication Service Assurance; Stage 2 and Stage 3 (Release 16).
3GPP TS 28.550 V16.7.0 (Dec. 2020), 3rd Generation Partnership Project; Technical Specification Group Services and System Aspects; Management and Orchestration; Performance Assurance (Release 16).
3GPP TS 28.551 V0.3.0 (Jul. 2018), 3rd Generation Partnership Project; Technical Specification Group Services and System Aspects; Management and Orchestration of Networks and Network Slicing; Performance Management (PM); Stage 2 and Stage 3 (Release 15).
3GPP TS 28.552 V17.1.0 (Dec. 2020), 3rd Generation Partnership Project; Technical Specification Group Services and System Aspects; Management and Orchestration; 5G Performance Measurements (Release 17).
3GPP TR 28.809 V1.1.0 (Nov. 2020), 3rd Generation Partnership Project; Technical Specification Group Services and System Aspects; Management and Orchestration; Study on Enhancement of Management Data Analytics (MDA) (Release 17).
ETSI GS ZSM-002 V1.1.1 (Aug. 2019), Zero-Touch Network and Service Management (ZSM); Reference Architecture.
ETSI GS ZSM-003 V0.19.1 (Sep. 2020), Zero-Touch Network and Service Management (ZSM); End to End Management and Orchestration of Network Slicing.
Draft ETSI GR ZSM-005 V0.4.1 (Mar. 2020), Zero-Touch Network and Service Management (ZSM); Means of Automation.
ETSIgs ZSM-007 V1.1.1 (Aug. 2019), Zero-Touch Network and Service Management (ZSM); Terminology for Concepts in ZSM.

* cited by examiner

| Source/Publication Date | Title | Description |
|---|---|---|
| TS28.535 v17.0.0 And TS28.536 v16.2.1 | Management Services For Communication Service Assurance | The Interface And The Procedure Used To Set Assurance Goal |
| ETSI GS ZSM009-1 V0.10.4 | Closed Loop Enablers | Closed Loop Governance Service. This Is The Generic Service Specifying The Functionalities Used To Govern The Closed Control Loop. In The Next Meeting Goal Configuration Will Be Added To This Service. |
| ETSI GS ZSM009-2 V0.4.1 | Closed Loop Solutions | Solution Towards The Delegation Service |
| ETSI GS ZSM002 V1.1.1 | Zero-Touch Network And Service Management (ZSM); Reference Architecture | The Architecture For E2E Management Domain And The Service Provided By Individual Management Domains. |

FIG. 7

| Consumer Settable Goal | Associated Conditions | Associated Sub-Goals | Relevant CL Governance Service Producer/ Condition Detection And Setting Service (Optional) |
|---|---|---|---|
| Coverage Optimization | RSRP Per Beam Limits | Handover Optimization, Coverage Hole Reduction | |
| Handover Optimization | Failed Handovers | | |
| NSI Load | | NSSI Load | NSSI Manage Service Provider |
| E2E Service Load | | Associated MD Service Load | MD Management |

FIG. 9

| Consumer Settable Goal | Associated Conditions | Associated Sub-Goals | Relevant CL Governance Service Producer/ Condition Detection And Setting Service (Optional) |
|---|---|---|---|
| NSSI Load | | TN Load | |
| MD Service Load | | TN Load, Switching Queues | |

FIG. 10

METHOD AND APPARATUS INCLUDING RECURSIVE CLOSED LOOP GOAL TRANSLATION AND CONFIGURATION

FIELD OF THE INVENTION

The present disclosure is directed to a device for managing one or more closed loop goals, where each of the control loops involves one or more criteria, some of which may not be directly measurable within the device, and more particularly where a translation entity can be used to convert the one or more non-directly measurable criteria to different alternative criteria. To the extent that some of the different alternative criteria identified through the translation may also not be directly measurable, the translation can be recursively applied to further convert any remaining criteria that can not be directly measured.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

As part of functioning within the network various operational parameters of the device may need to be managed in order for device to more efficiently operate as intended, while allowing for information to be shared between the device and the network, and while also helping to better balance the desired performance of the device with the potential negative impact on other devices operating within the shared environment of the network.

In support of such a balancing, various target values can be identified, which when met may help to better manage the overall performance of the device. In many cases, the target values can be related to a detectible criteria, which has been identified as being consistent with the desired performance. Several operating parameters may be correlated with a set of criteria, where a control loop can be used to adjust the criteria by adjusting the value of the correlated operating parameters. However, in some cases, at least some of the criteria associated with a particular control loop may not be directly measurable, which in turn may make it more difficult to fully evaluate whether an attempted change in operation serves to help a particular device better meet its overall operating goals within a network.

The present inventors have recognized that it would be beneficial if a device having a control loop, which is associated with a criteria that can not be readily directly measured, could convert via a translation entity the non-directly measurable criteria to different criteria, which could be alternatively used to evaluate the operating performance of the device relative to one or more desired conditions or goals. Furthermore, to the extent that such a conversion by the translation entity identifies further criteria that can not readily be directly measured, the translation entity could be recursively applied until all non-directly measurable criteria have been avoided.

SUMMARY

The present application provides a management entity for controlling an execution of at least one managed entity operating within a network. The management entity includes a controller adapted for establishing a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity within operating constraints of the established control loop. The controller is further adapted for identifying a translation for each of the at least one of the one or more associated criteria that can not be directly determined using one or more different criteria that can be directly determined by the management entity within the operating constraints of the established control loop. The controller is further adapted for detecting the one or more criteria of the control loop that can be directly determined, and the identified different criteria that can be directly determined for the one or more criteria of the control loop that can not be directly determined; and adjusting a performance of the at least one managed entity relative to the defined target performance within the control loop, based upon the detected one or more criteria of the control loop and the identified different criteria.

According to another possible embodiment, a method in a management entity for controlling an execution of at least one managed entity operating within a network is provided. The method includes establishing a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity within operating constraints of the established control loop. A translation is identified for each of the at least one of the one or more associated criteria that can not be directly determined using one or more different criteria that can be directly determined by the management entity within the operating constraints of the established control loop. The one or more criteria of the control loop that can be directly determined, and the identified different criteria that can be directly determined for the one or more criteria of the control loop that can not be directly determined are detected. A performance of the at least one managed entity is adjusted relative to the defined target performance within the control loop, based upon the detected one or more criteria of the control loop and the identified different criteria.

These and other features, and advantages of the present application are evident from the following description of one or more preferred embodiments, with reference to the accompanying drawings.

BRIEF DESCRIPTION OF THE DRAWINGS

FIG. 7 is a table illustrating a list of current related standards;

FIG. 9 is a table corresponding to an example of database that maintains a mapping of closed loop goals to associated conditions and/or subgoals at an end to end (E2E) management domain (MD) level.

FIG. 10 is a table corresponding to an example of a database that maintains a mapping of closed loop goals to associated conditions and/or sub-goals in a transport network (TN) management domain level.

DETAILED DESCRIPTION OF THE PREFERRED EMBODIMENT(S)

Figure 1:
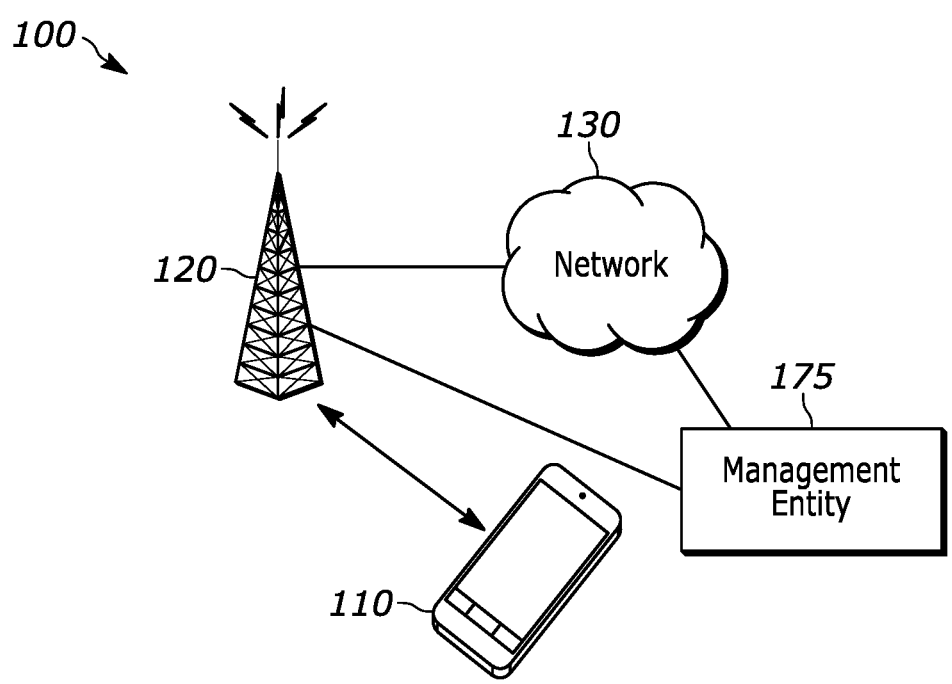
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide recursive closed loop goal translation and configuration, such as in a telecom network.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. In the embodiment illustrated, the network can be further associated with a management entity 175, that can serve to facilitate the control of one or more managed entities, which can correspond to a separate entity in and/or coupled to the network 130 and/or could be integrated as part of another entity, such as the wireless communication device 110, or base station 120 for managing the operation of one or more managed entities. In some instances, the management entity can be a part of an entity being managed.

The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In the current 3GPP SA5 TS28.536 and in European Telecommunications Standards Institute (ETSI) zero touch network and service management (ZSM) work item ZSM009-1 closed loops can be configured with goals that the closed loops tries to meet. This configuration is done by any appropriate consumer that is authorized to configure such goals. In other instances, there may be loops specified by a different consumer (different verticals industries), different tenants, different network slice owners and so forth. In addition to different consumers, goals may also be specified at different levels of the managed entity stack or the policy continuum and may need to be translated to different levels in the managed entity stack or the policy continuum. There is a possibility that the consumer setting the goals expresses the goals in a language different from the language of the network (of that particular management domain) or that the goal is set for key performance indicators (KPIs) that requires the goal to be translated to other KPIs or entities in the network. In addition, in management systems, recursive stacking of management domains is possible so any set goal may need to be appropriately set throughout the management domain levels.

Figure 2:
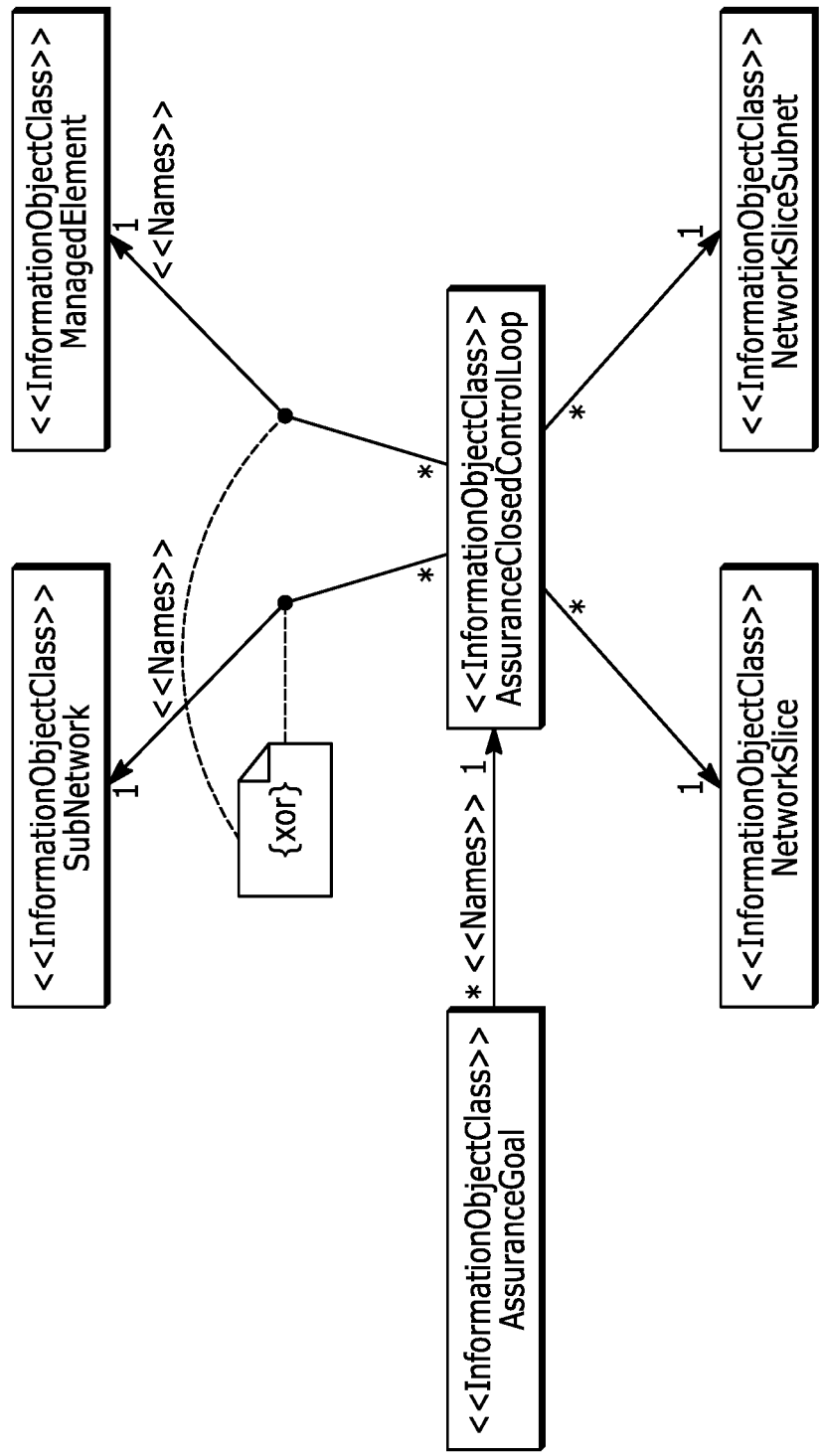
FIG. 2 is a block diagram of an exemplary closed loop model, such as the closed loop model illustrated in the third generation partnership project (3GPP) technical specification (TS) 28.536 v16.2.1.

5G introduces the concept of network slicing with the intention that the operator can support different services for different vertical customers (auto vehicle to everything (v2x), Internet of Things (IoT), enhanced mobile broadband (eMBB), Industry 4.0 ultra reliable low latency communications (URLLC)). The network slices are supposed to be hosted over virtualized infrastructure across management domains. Current work on automation of such a network in ETSI ZSM and in 3GPP SA5 has focused on closed loops as an enabler for achieving automation. The current 3GPP TS 28.535 and 3GPP TS 28.536 describe assurance closed control loops (ACCL) or simply closed loop (CL) in the information model as shown in FIG. 2. Each assurance control loop can consist of one or more assurance goals (or closed loop goals) and many CLs can act on a network slice or a network slice subnet. FIG. 2 illustrates a block diagram 200 of an exemplary closed loop model, such as the closed loop model illustrated in 3GPP TS 28.536 v16.2.1.

The assurance goal(s) corresponding to a CL can be set by any authorized CL consumer and can consist of an assuranceTargetList which currently can be a list of name-value pairs that indicate a KPI goal that the closed loop should try to achieve (referred in this disclosure simply as an assurance goal or the control loop goal (CLG)). Even though currently not supported in 3GPP, in general, these goals may be any optimization related criterion (min/max) an inequality (less than or greater than) or an equality constraint (name=value as currently specified). Different entities may set different goals at different levels. Different consumers (responsible for different network slice instances or different network slice subnet instances) may set different goals for the CLS responsible for their network slice instances—however these may then be delegated to other closed loops that are in different management domains (management domains are explained below).

The consumer of the CL may not always be familiar with which KPIs correspond to the goals that the consumer wants to achieve, such as the goals that the consumer sets The CL may not be based on directly measurable KPIs in the network. For example: the goal could be to optimize coverage, however, coverage is not directly a measurable KPI.

The CL can be based on a KPI that is a combination of multiple KPIs or KPIs from multiple domains which are directly measurable. For example, the goal could be to minimize the use of virtual resources for a network slice instance —which would imply collecting KPIs relating to multiple virtual network resources from multiple management domains and different technologies.

The goals could be set at a service level and would then need to be derived from network level KPIs.

Control Loops—Open and Closed.

Figure 3:
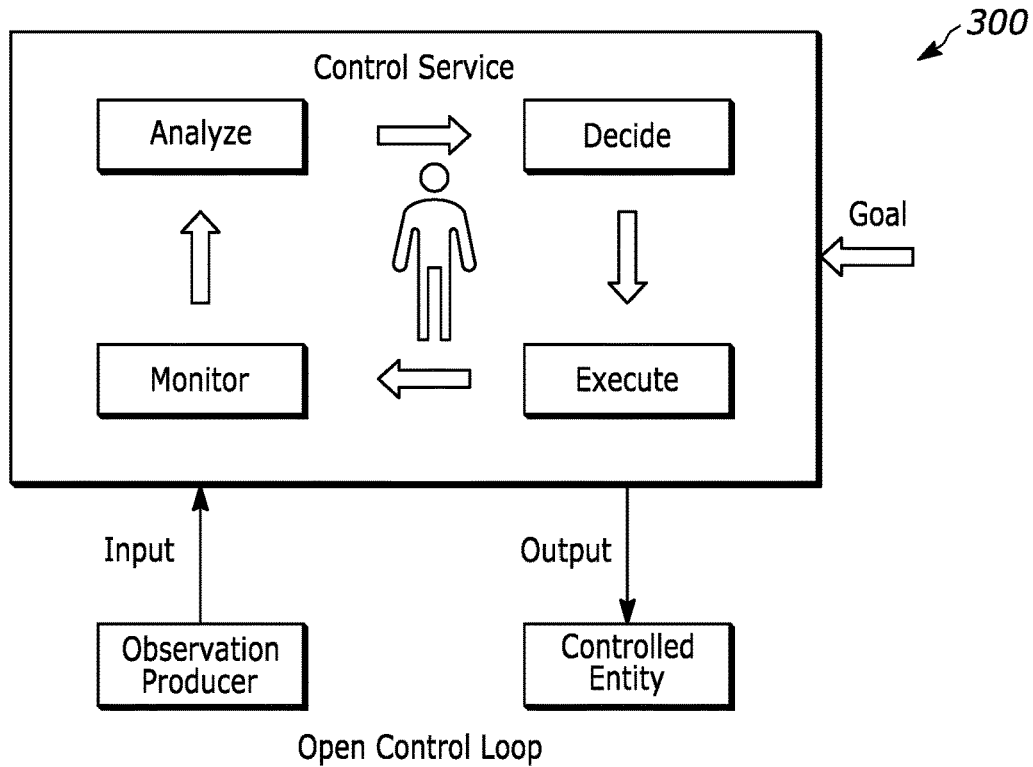
FIG. 3 is a block diagram of an exemplary open control loop.
Figure 4:
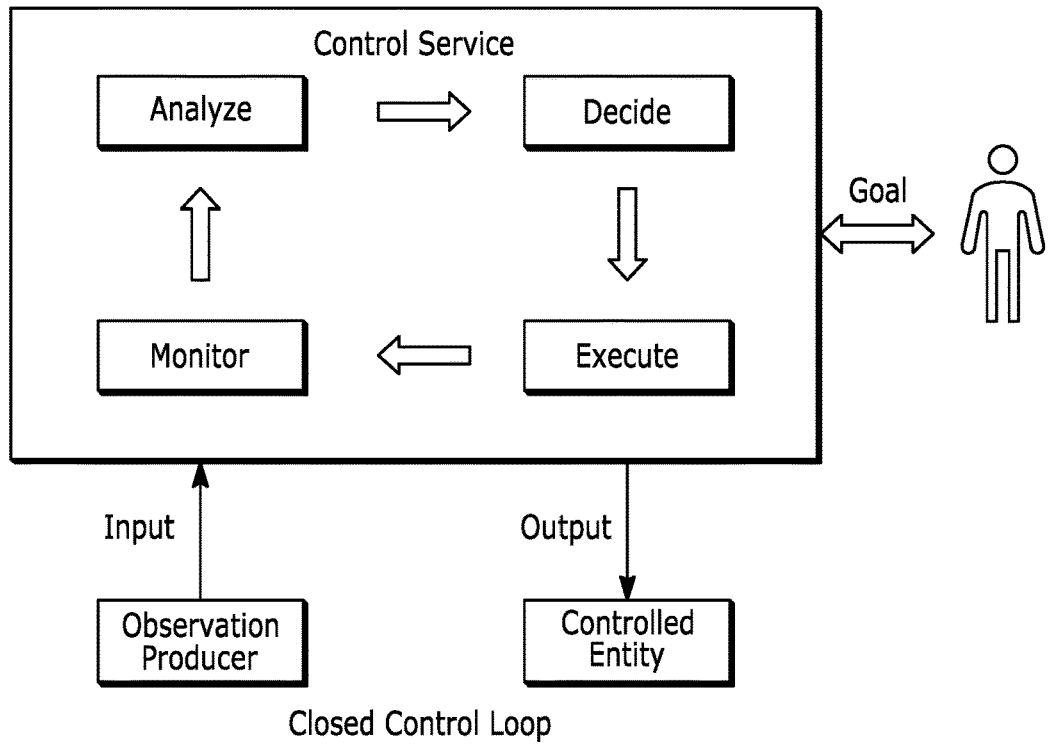
FIG. 4 is a block diagram of an exemplary closed control loop.

Work in SA5 (3GPP TS 28.535) and elsewhere defines the two alternatives of open and closed control loops, such as open control loops and closed control loops as shown in FIGS. 3 and 4. Open loops involve the operator to be a part of at least one of the stages in the loop, while in the closed loop stage the operator defines a goal for the closed control loop and the loop once configured runs automatically. Both control loops attempt to control the status of a managed object trying to keep it as close as possible to the specified goal(s).

FIG. 3 illustrates a block diagram 300 of an exemplary open control loop.

FIG. 4 illustrates a block diagram 400 of an exemplary closed control loop. This disclosure is equally valid for both types of the CLs and everything in between.

Management Domains

Management domains are a collection of resources that have their own management system. A management system is for example any set of management services or their implementations in management functions. Thus, management domains can include things such as vendor devices with their own management system, vendor solutions, technical domains such as 3GPP core, 3GPP radio access network (RAN), cloud domains, data centers, transport networks with their own controllers, operator administrative domains, country domains and so forth. Further details can be found in ETSI GS ZSM007.

Figure 5:
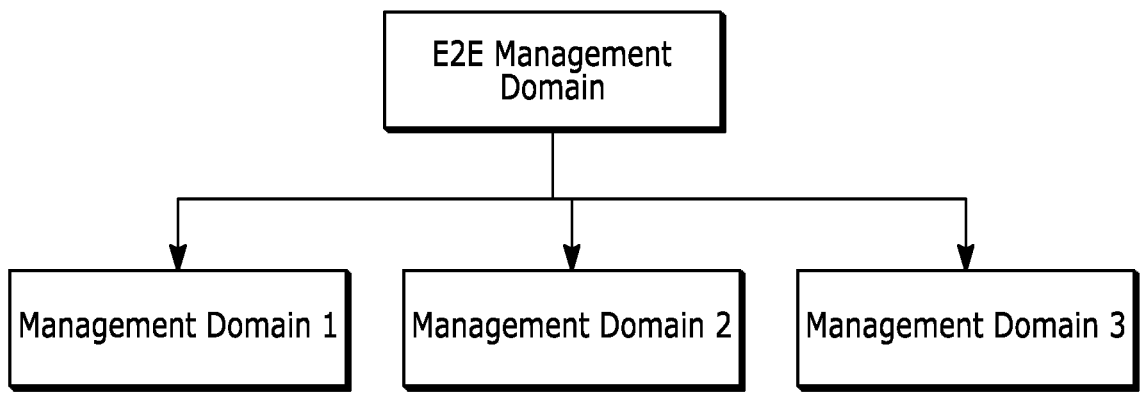
FIG. 5 is a block diagram of an example of management domains in a logical deployment representation in an operator network.

FIG. 5 illustrates a block diagram 500 of an example of management domains in a logical deployment representation in an operator network.

Figure 6:
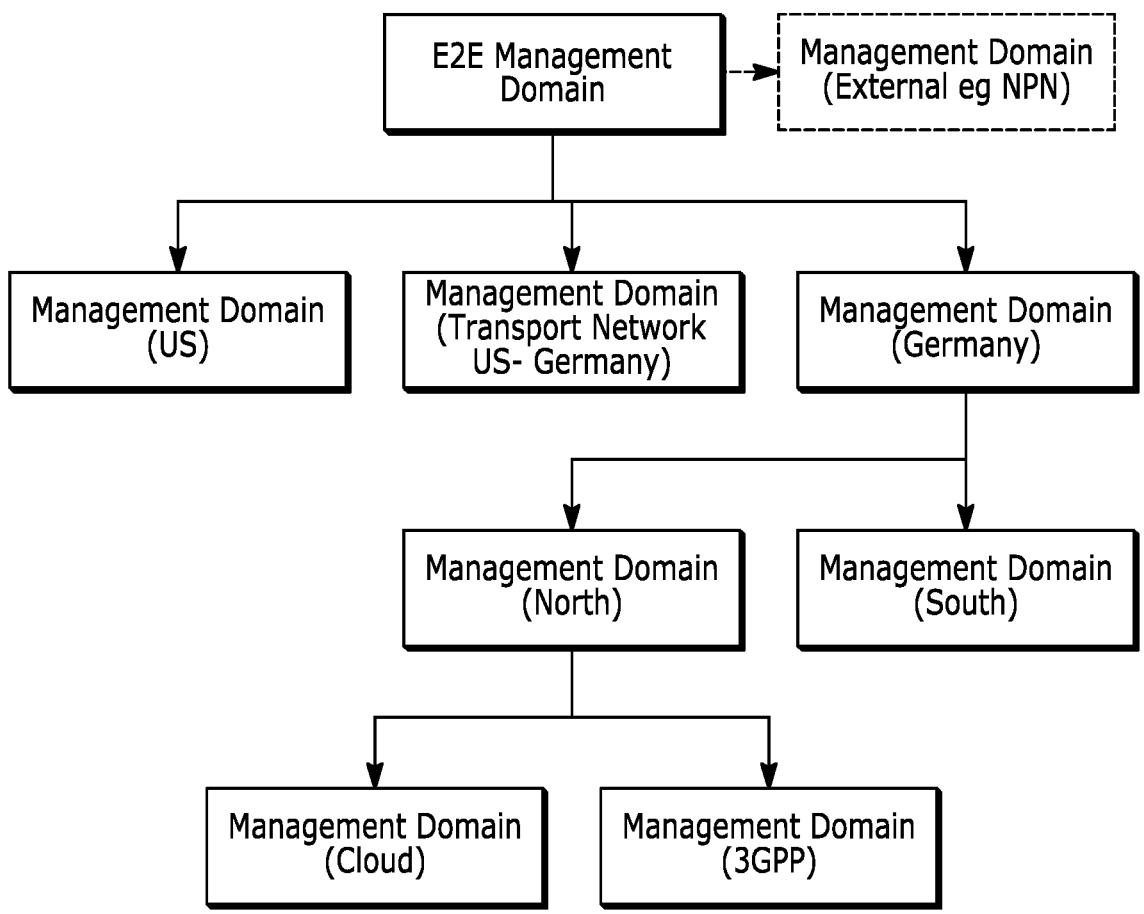
FIG. 6 is a block diagram illustrating an examplary possible deployment of management domains.

FIG. 6 illustrates a block diagram 600, which shows an example possible deployment of management domains for an operator that provides service in US and Germany. Only the German domain is further expanded to show the recursion in management domains. FIG. 6 is intended as an example of a management domain, such as the logical management domain illustrated in FIG. 5 and further domains such as vendor specific management domains/equipment that may exist (not shown).

A list of current related standards is shown in a table 700 illustrated in FIG. 7. For example, SA5 (TS28.536 v16.0.0) discusses an ability to set a control loop (assurance control loop) goal. In ETSI ZSM 9-1 and ETSI ZSM 9-2 the concept of delegation of a goal is introduced where a configured goal is delegated to other closed loops in other management domains.

At a high level, in accordance with at least some solutions, a translating entity exists in the network that translates the high-level goal from the one expressed by the consumer to the one understandable by the network. An example of such a translation is coverage optimization a consumer may configure its CL to optimize coverage. There is no standardized KPI representing coverage optimization in TS28.552. Instead a more optimal coverage or lack thereof may be derived from other supporting KPIs such as handover ping pong and so forth. Other such optimization criteria could be provided by an operator.

In at least a first embodiment, the operator can maintain a mapping of the high-level goal as specified by the consumer to the low level KPIs in the network in a translation database. The support for such high-level goals can be 1. a part of the capabilities of an end to end (E2E) management domain, and/or
2. discovered in the E2E management domain from that supported by the individual management domains.

A goal to condition/KPI translation service entity then can provide the translation of the goals to the respective network KPI and optionally provide the identities of which CL governance service producers support the KPI. Note that the KPIs could in turn be goals in the respective CL governance service producers and may again be translated therein.

Figure 8:
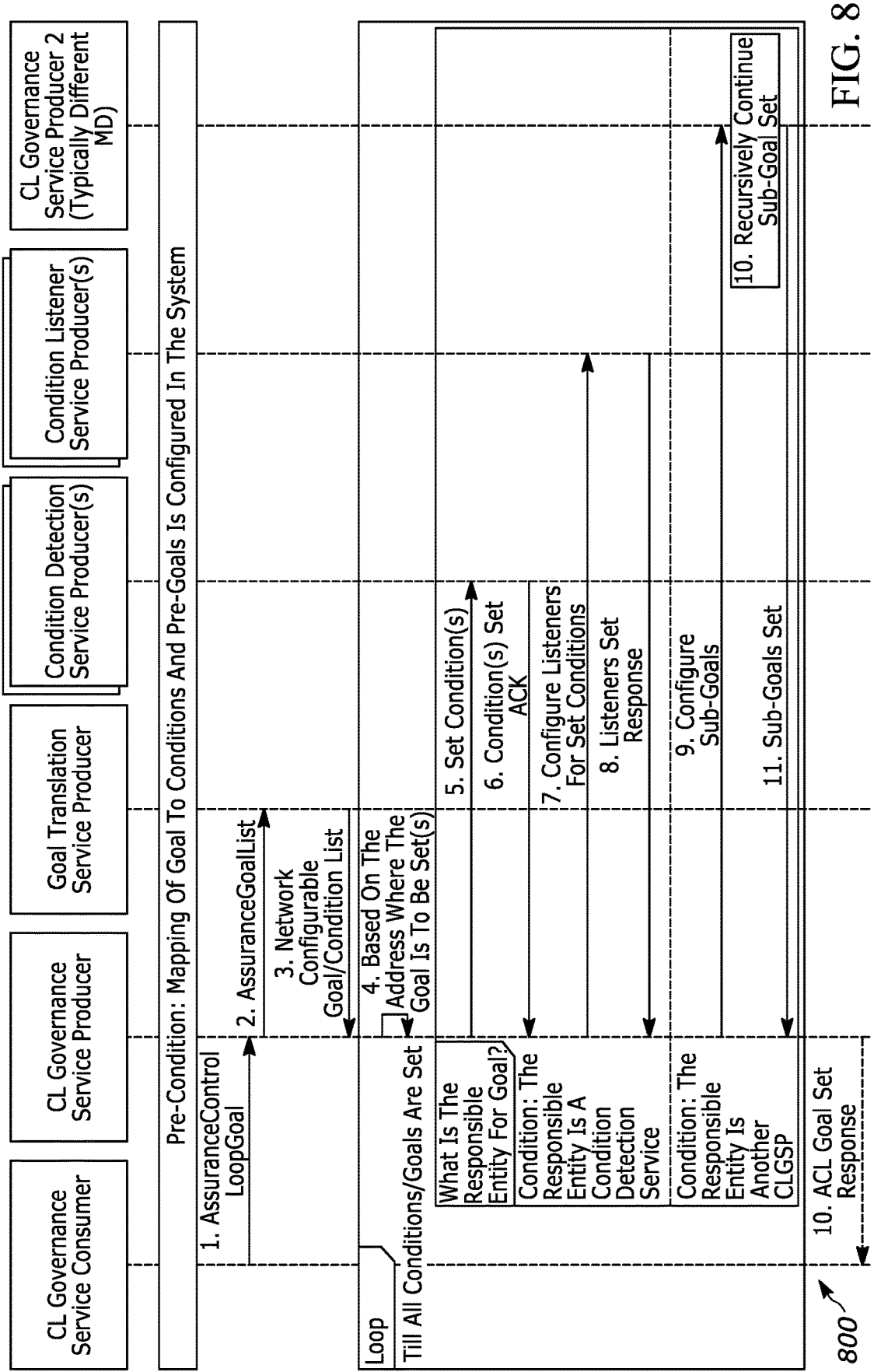
FIG. 8 is an exemplary scenario sequence diagram, which can correspond to a generic high level solution, including the provision for a goal translation entity.

FIG. 8 illustrates an exemplary scenario sequence diagram 800, which can correspond to a generic high level solution, including the provision for a goal translation entity. It is expressly noted that the generic high-level solution illustrated in FIG. 8, does not mandate the order of steps. Further, there may be additional intermediate steps in between.

Explanation of the Entities in the Steps

CL governance service consumer: any consumer of the authorized service who or which is authorized to configure the goals. Examples can include (1) an operator, or (2) another CL governance service producer.

CL governance service producer (CLGSP): the implementation of the management service that is responsible for configuring the goals for a set of CLs or in a management domain (example: as specified in ZSM009-1). CLGSP may also be a known CL manager and could be part of the entity responsible for closed loop management in the respective management domain.

Goal translation service producer: an entity that can translate provided goals to individual KPIs or sub goals or conditions.

The goal translation service producer could internally use a simple data base configured by the operator that maintain the mapping of the goal to the sub-goal or the conditions. An example is shown FIG. 9. More specifically, FIG. 9 illustrates a table 900 corresponding to an example of database that maintains a mapping of closed loop goals for associating conditions and/or subgoals at an end-to-end (E2E) management domain (MD) level. FIG. 10 illustrates a table 1000 corresponding to an example of a database that maintains a mapping of closed loop goals for associating conditions and/or sub-goals in a transport network (TN) management domain level.

Condition detection service producer: refers to an implementation of a listening service that issues notifications when the configured condition is met (example: implementation of condition detection service in ETSI GS ZSM002 or threshold notification service in TS28.532).

Assurance Goals: refer to goals configured by a consumer

Translated or configurable goals: refer to goals that the CLGSP in the management system knows how and where to configure.

At a higher level, in accordance with at least one embodiment, the process provides for the following types of steps, namely Pre-condition: the mapping of settable goals to the individual association conditions or sub goals is known in the system using a database that maintains such mapping. An example of such a database in shown in FIG. 9.
1. In step one the request for an assurance goal is sent by the CL governance service consumer (CLGSC) to the CL governance service producer (CLGSP). The configured assurance goal could be
   a. equal to conditions where some value (KPI, service level specification (SLS) or service level agreement (SLA) should be equal to a numeric quantity
   b. less than or greater than constraints where some (KPI, SLS or SLA) is greater than or less than a threshold value
   c. optimization model which consists of a cost function to be optimized and optionally the respective constraints
   d. any SLA or SLS value
Supplementary conditions under which the goal is valid may be specified.
Examples include
   i. time of day
   ii. geographic area
   iii. specific management domains
2. The list of assurance goal from Step 1 that are not directly configurable in the condition detection service are provided to the Goal Translation Service Producer (GTSP) with the intention of translating them into goals configurable in the condition detection service. The GTSP in one implementation could look up a translation table as in FIG. 9 to determine the associated sub-goals and the entity that could be used to set those goals (a condition detection service or another CL governance service producer). The translation of goals by the GTSP can be
   a. based on the vendor specific implementation of the goals
   b. based on technology specific understanding of the goals
   c. based on operator configured translations in the database or operator specific implementation
3. The list of translated goals and the address of the respective entities where they can be configured can be sent back to the CLGSP.
For Each Goal in the List . . . .
4. The CLGSP can evaluate the type of address/entity where the goal is to be set and the exact address of the said entity.
5. If the entity is the condition detection service producer (CDSP), then the goal (or condition) can be set in the appropriated CDSP.
6. The CDSP can acknowledge the goal/condition is correctly set and can provide the detail of the notification when the condition is met.
7. The listeners to the notification for the set conditions in step 5 and 6 can be set in the condition listener service provider (CLSP). The listeners can be entities responsible for handling the notification raised when the condition is met. Handling the notification of the set condition could involve, for example, starting analysis of why the condition has been met to search for a possible resolution. The CLSP could in certain conditions that may be specified in Step 1 be associated with the CLGSC.
8. The response to setting the listeners can be sent to the CLGSP.
9. If the goal is typically supported by another CLGSP (in this case CLGSP2) then the goal is configured in the appropriate instance of the CLGSP (in this case CLGSP 2).
10. CLGSP 2 recursively may carry out this entire procedure again internally.
11. When the goal set in Step 10 is completed the CLGSP 2 can reply with a successful acknowledgement of goal set.
. . . till all goals are set.

Figure 11:
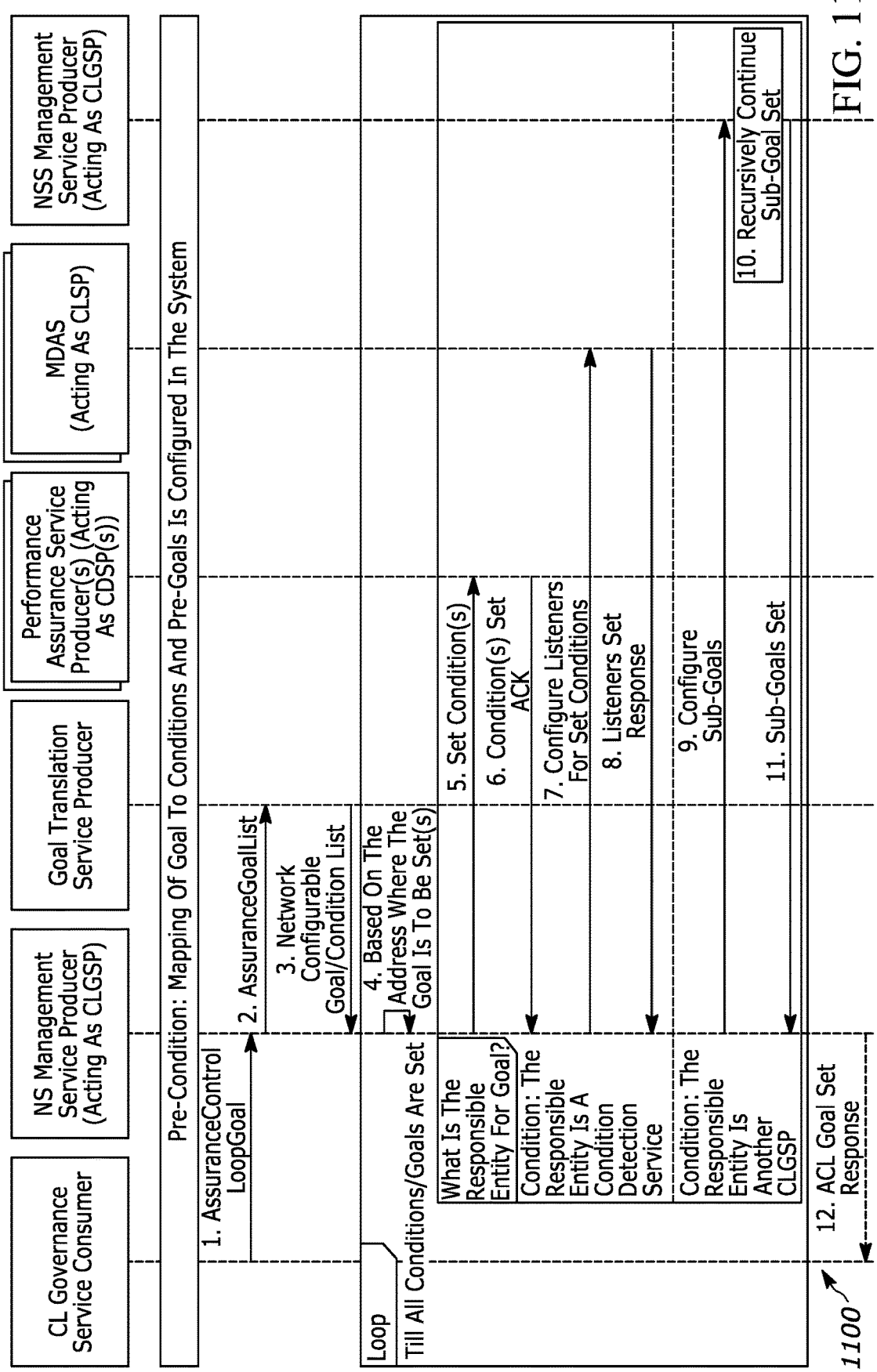
FIG. 11 is an exemplary scenario sequence diagram, which can correspond to goal setting and translation in a 3rd Generation Partnership Project (3GPP) network.

In accordance with at least a further embodiment, FIG. 11 illustrates an exemplary scenario sequence diagram 1100, which can correspond to goal setting and translation in a 3rd Generation Partnership Project (3GPP) network.

The embodiment related to management of 3GPP networks is shown in the FIG. 11. The term Network Slice and Network Slice Subnet are as defined in 3GPP. A management service producer is an entity that implements the management capabilities specified as part of the management service.

Explanation of the Entities in the Steps

In this embodiment a management service producer at the network slice (NSMSP) level can handle the assurance goal configuration (therefore the NSMSP can act as the CLGSP). The management service producer could be for example the provisioning service producer (as described in 3GPP TS 28.532) responsible for configuring the Network Slice based on the ServiceProfile that can include the SLA or SLS or Goal specifications.

A Performance Assurance Service Producer (described in TS 28.550, TS 28.551) can act as the CDSP, where respective conditions relating to the CL goal can be set.

The Management Domain Analytics Service (MDAS) (as described in technical report (TR) 28.809) can act as the handler for triggered conditions therefore as the CLSP.

A Network Slice Subnet Management Service Producer (NSSMSP) can act as the second CLGSP for example for the RAN part of the network slice instance.

In accordance with at least one embodiment, the process provides for the following types of steps, namely
1. An AssuranceControlLoop goal can be configured at the NSMSP by the CLGSC.
2. The assurance goals specified by the CLGSC may not be directly configurable in the network, therefore the NSMSP can request the GTSP to provide for each Assurancegoal—a list of translated goals to be set and the addresses where to set them.
3. The GTSP based on its understanding of the assuranceGoals, SLA, SLS provides the list of internally configurable conditions or configurable goals and the entities (CDSP or another CLGSP) where they can be configured.

For Each Configurable Goal in List . . . .
  4. Determine where the configuration is to be done—whether CLGSP or CDSP.
If it is a Condition to be Set in a CDSP
  5. The NSMSP contact the appropriate instance of the CDSP provider, in this embodiment the performance assurance service producer can also acts as the CDSP.
  6. The acknowledgement when the condition is correctly set can be received optionally with details about the expected notification.
  7. Optionally, the NSMSP may also configure the listeners (using for example the notifications received in step 6) for the condition.
  8. Acknowledgement that the listeners are set.
If it is a Goal to be Set in Another CLGSP
  9. Configure the sub-goal to the NSSMSP (acting as a different CLGSP). For the NSSMSP this can now be an assuranceGoal.
  10. The NSSMSP may recursively repeat the same procedure till the goal is set
  11. An acknowledgement of the goal set can be returned to the NSMSP.
  12. An acknowledgement of the goal set can be returned by the NSMSP. If any of the above steps fails or any of the translations is not configurable then an error can be returned.

Figure 12:
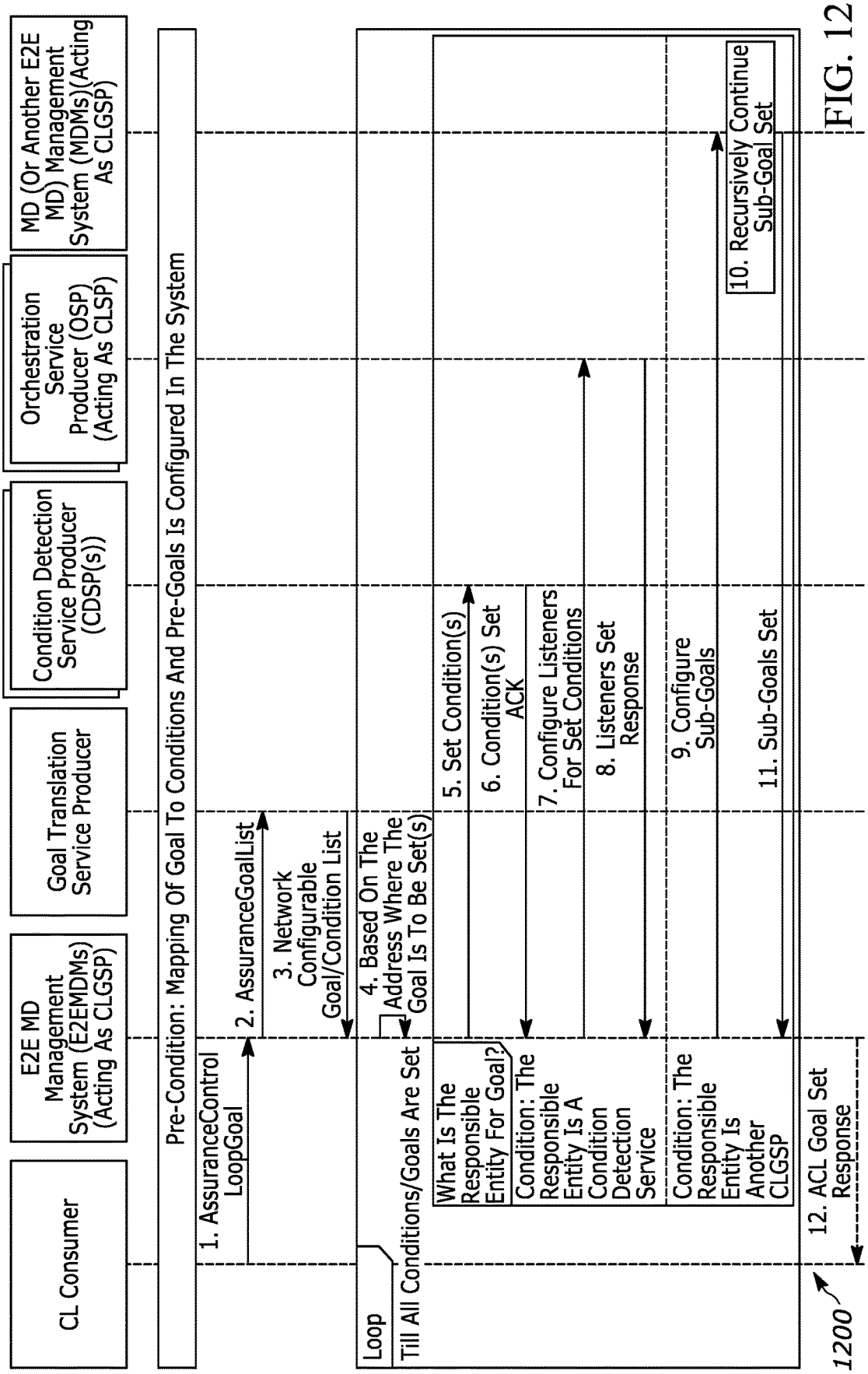
FIG. 12 is an exemplary scenario sequence diagram, which can correspond to goal setting and translation in a European Telecommunications Standards Institute (ETSI) zero touch network and service management (ZSM) network.

In accordance with at least a further embodiment, FIG. 12 illustrates an exemplary scenario sequence diagram 1200, which can correspond to goal setting and translation in a European Telecommunications Standards Institute (ETSI) zero touch network and service management (ZSM) network.

Explanation of the Entities in the Steps
  The E2E MD and the MD are as explained in FIG. 8.
  The management system at the E2E level (E2EMDMs) as well as the MD level (MDMs) can provide the CL governance service implementation and therefore can play the role of CLGSP.
  The condition detection service producer provides the setting of condition as described in the condition detection service on ETSI ZSM GS ZSM002 and can play the role of the CDSP.
  The orchestration service producer (OSP) can play the role of CLSP. The orchestration service is described in ETSI ZSM GS ZSM002.

In accordance with at least one embodiment, the process provides for the following types of steps, namely
  1. An AssuranceControlLoop goal can be configured at the E2EMDMs by the CL consumer.
  2. The assurance goals specified by the CL consumer may not be directly configurable in the network, therefore the E2EMDMs can request the GTSP to provide for each Assurance goal—a list of translated goals to be set and the addresses where to set them.
  3. The GTSP based on its understanding of the assurance Goals (SLA, SLS) can provide the list of internally configurable conditions or configurable goals and the entities (CDSP or another CLGSP) where they can be configured. This implies that the GTSP can translate goals across management domain capabilities of setting goals, including translating goals across multi-technology or multi-vendor platforms.
For Each Configurable Goal in List . . . .
  4. Determine where the configuration is to be done—whether CLGSP or CDSP.
If it is a Condition to be Set in a CDSP
  5. The E2EMDMs contacts the appropriate instance of the CDSP provider, in this embodiment the performance assurance service producer also acts as the CDSP. Typically, this CDSP provider can be in the same management domain.
  6. The acknowledgement when the condition is correctly set can be received optionally with details about the expected notification.
  7. Optionally, the E2EMDMs may also configure the listeners (using for example the notifications received in step 6) for the condition.
  8. Acknowledgement that the listeners are set.
If it is a Goal to be Set in Another CLGSP
  9. Configure the sub-goal to the MDMs (acting as a different CLGSP). For that MDMs this can now be an assuranceGoal.
  10. The MDMs may recursively repeat the same procedure till the goal is set.
  11. An acknowledgement of the goal set can be returned to the E2EMDMs.
  12. An acknowledgement of the goal set can be returned by the E2EMDMs. If any of the above steps fails or any of the translations is not configurable then error can be returned.

In accordance with at least some embodiments, methods and apparatus are provided, which include translating goals that are not configurable at a network level across the various levels of the deployment infrastructure of the operator as well as across the multiple domains. For example, a configuration of intent or an SLA parameter for a service is translated to a closed-loop goal at a Network Slice level which is, in turn, translated to the Network Slice Subnet level(s) and then from a Network Slice subnet level to a Network Function level.

In accordance with at least some embodiments, the entity GTSP is to be able to translate goals across technical or vendor specific management domain.

In at least some instances, the goals throughout the operator network may benefit from an automatic configuration.

Figure 13:
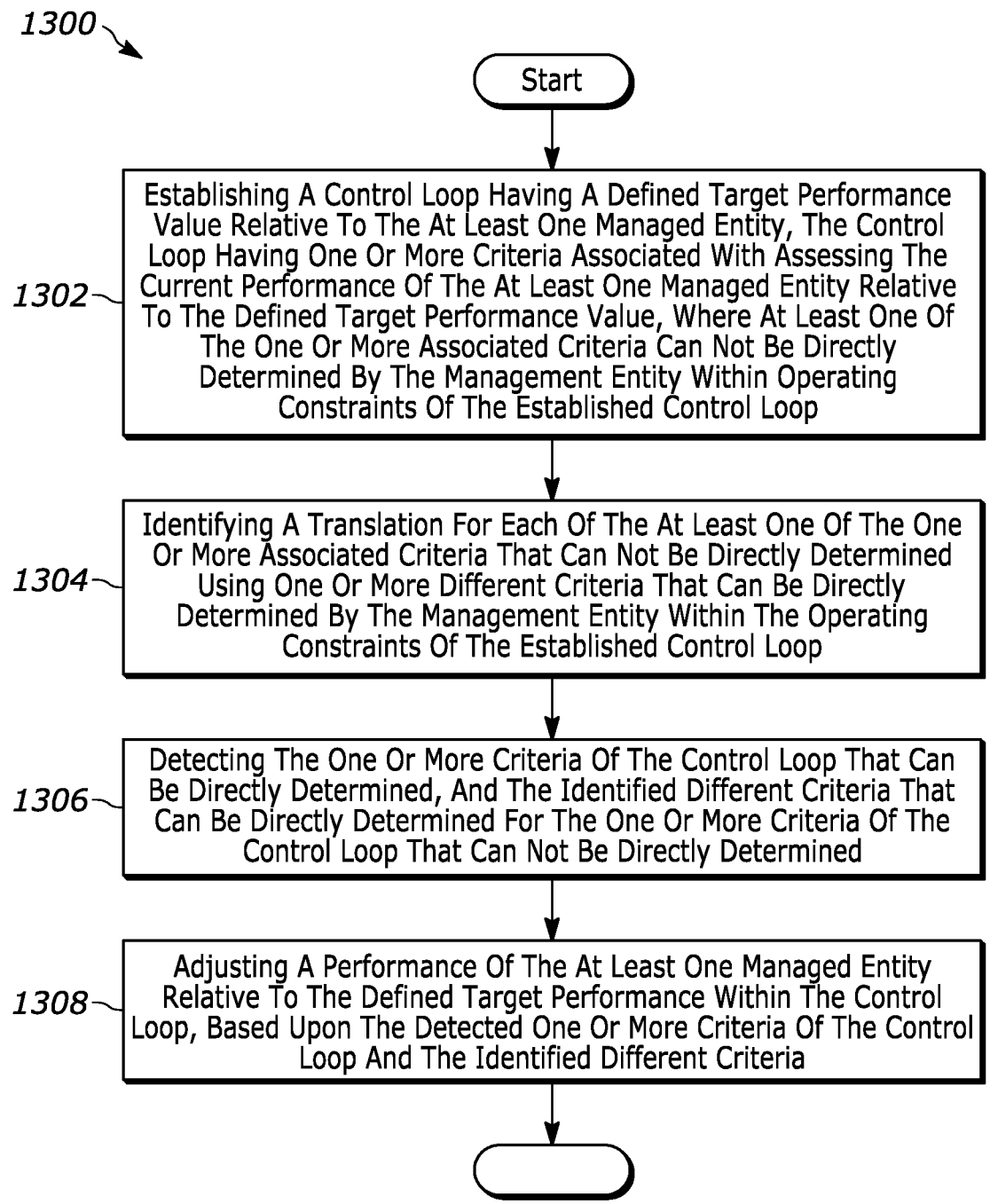
FIG. 13 is a flow diagram in a management entity for controlling an execution of a managed entity operating within a network including identifying a translation for each of the at least one of the one or more associated criteria that can not be directly determined.

FIG. 13 illustrates a flow diagram 1300 in a management entity for controlling an execution of at least one managed entity operating within a network including event triggered goal change for one or more control loops, according to a possible embodiment. In accordance with at least one embodiment, the method can include establishing 1302 a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity within operating constraints of the established control loop. A translation is identified 1304 for each of the at least one of the one or more associated criteria that can not be directly determined using one or more different criteria that can be directly determined by the management entity within the operating constraints of the established control loop. The one or more criteria of the control loop that can be directly determined, and the identified different criteria that can be directly determined for the one or more criteria of the control loop that can not be directly determined are detected 1306. A performance of the at least one managed entity is adjusted 1308 relative to the defined target performance within the control loop, based upon the detected one or more criteria of the control loop and the identified different criteria.

In some instances, identifying the translation for each of the at least one of the one or more associated criteria that can not be directly determined includes accessing the associated information via a conveyance including the receipt of a performance status indication determined at an operational level that is different than an operational level of the control loop. In some of these instances, the different operational levels can include different levels in a managed entity stack. In some of these and other instances, the different operational levels can include different levels in a policy continuum. In some instances, the different operational levels can include different management domains. Further, at least some of the different operational levels each can correspond to different communication services or network slice instances. Still further, each operational level can be associated with a different management entity.

In some instances, the defined target performance value can include a meeting of a value relative to a particular one of the one or more criteria.

In some instances, the defined target performance value can include an optimizing of performances relative to multiple ones of the one or more criteria.

In some instances, the one or more criteria can include one or more of detectable conditions or goals.

In some instances, the translation can include communicating with another entity that performs the translation.

In some instances, the translation can include a conversion between different languages used for different levels.

In some instances, when the controller is identifying the translation for each of the at least one of the one or more associated criteria that can not be directly determined, if the translation includes a further criteria that can not be directly determined, the controller can be further adapted to identify a further translation of the further criteria. In some of these instances, the identification of a translation can be recursively applied until a proceeding identification of a translation does not produce any further criteria that can not be directly determined.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 14:
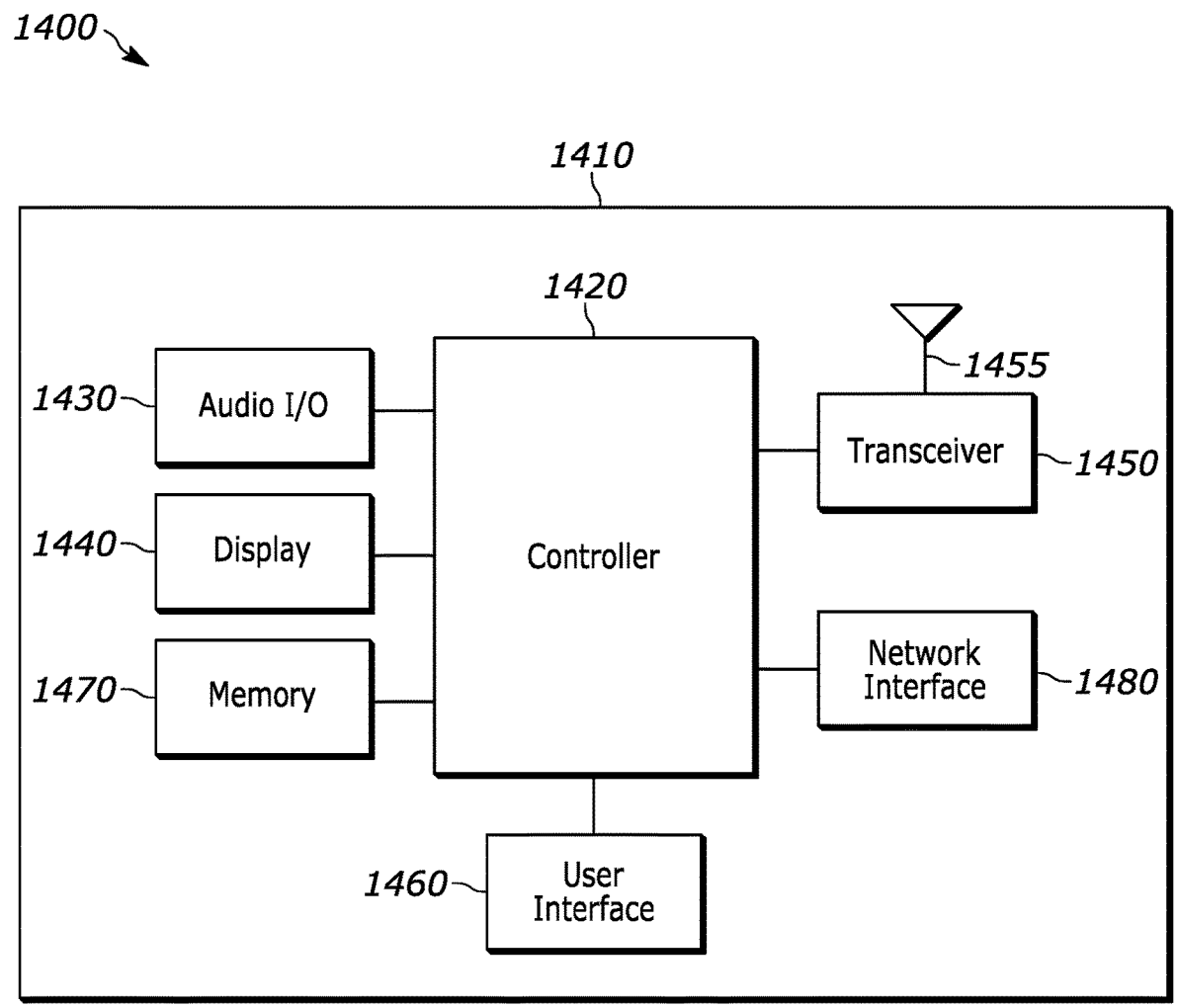
FIG. 14 is an example block diagram of an apparatus according to a possible embodiment.

FIG. 14 is an example block diagram of an apparatus 1400, such as the wireless communication device 110, according to a possible embodiment. The apparatus 1400 can include a housing 1410, a controller 1420 within the housing 1410, audio input and output circuitry 1430 coupled to the controller 1420, a display 1440 coupled to the controller 1420, a transceiver 1450 coupled to the controller 1420, an antenna 1455 coupled to the transceiver 1450, a user interface 1460 coupled to the controller 1420, a memory 1470 coupled to the controller 1420, and a network interface 1480 coupled to the controller 1420. The apparatus 1400 can perform the methods described in all the embodiments.

The display 1440 can be a viewfinder, a liquid crystal display (LCD), a light emitting diode (LED) display, a plasma display, a projection display, a touch screen, or any other device that displays information. The transceiver 1450 can include a transmitter and/or a receiver. The audio input and output circuitry 1430 can include a microphone, a speaker, a transducer, or any other audio input and output circuitry. The user interface 1460 can include a keypad, a keyboard, buttons, a touch pad, a joystick, a touch screen display, another additional display, or any other device useful for providing an interface between a user and an electronic device. The network interface 1480 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1470 can include a random access memory, a read only memory, an optical memory, a solid state memory, a flash memory, a removable memory, a hard drive, a cache, or any other memory that can be coupled to an apparatus.

The apparatus 1400 or the controller 1420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1470 or elsewhere on the apparatus 1400. The apparatus 1400 or the controller 1420 may also use hardware to implement disclosed operations. For example, the controller 1420 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1420 may be any controller or processor device or devices capable of operating an apparatus and implementing the disclosed embodiments. Some or all of the additional elements of the apparatus 1400 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A management entity for controlling an execution of at least one managed entity operating within a network, the management entity comprising:
    at least one controller coupled with at least one memory and configured to cause the management entity to establish a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity within operating constraints of the established control loop;
    the at least one controller is further configured to identify a translation for each of the at least one of the one or more associated criteria that can not be directly determined using one or more different criteria that can be directly determined by the management entity within the operating constraints of the established control loop;
    the at least one controller is further configured to detect the one or more criteria of the control loop that can be directly determined, and the identified different criteria that can be directly determined for the one or more criteria of the control loop that can not be directly determined; and adjusting a performance of the at least one managed entity relative to the defined target performance within the control loop, based upon the detected one or more criteria of the control loop and the identified different criteria.

2. The management entity in accordance with claim 1, wherein identifying the translation for each of the at least one of the one or more associated criteria that can not be directly determined includes accessing the associated information via a conveyance including the receipt of a performance status indication determined at an operational level that is different than an operational level of the control loop.

3. The management entity in accordance with claim 2, wherein the different operational levels include different levels in a managed entity stack.

4. The management entity in accordance with claim 2, wherein the different operational levels include different levels in a policy continuum.

5. The management entity in accordance with claim 2, wherein the different operational levels include different management domains.

6. The management entity in accordance with claim 2, wherein at least some of the different operational levels each correspond to different communication services or network slice instances.

7. The management entity in accordance with claim 2, wherein each operational level is associated with a different management entity.

8. The management entity in accordance with claim 1, wherein the defined target performance value includes a meeting of a value relative to a particular one of the one or more criteria.

9. The management entity in accordance with claim 1, wherein the defined target performance value includes an optimizing of performances relative to multiple ones of the one or more criteria.

10. The management entity in accordance with claim 1, wherein the one or more criteria includes one or more of detectable conditions or goals.

11. The management entity in accordance with claim 1, wherein the translation includes communicating with another entity that performs the translation.

12. The management entity in accordance with claim 1, wherein the translation includes a conversion between different languages used for different levels.

13. The management entity in accordance with claim 1, wherein when the at least one controller is identifying the translation for each of the at least one of the one or more associated criteria that can not be directly determined, if the translation includes a further criteria that can not be directly determined, the at least one controller is further configured to identify a further translation of the further criteria.

14. The management entity in accordance with claim 13, wherein the identification of a translation is recursively applied until a proceeding identification of a translation does not produce any further criteria that can not be directly determined.

15. A method in a management entity for controlling an execution of at least one managed entity operating within a network, the method comprising:
    establishing a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity within operating constraints of the established control loop;
    identifying a translation for each of the at least one of the one or more associated criteria that can not be directly determined using one or more different criteria that can be directly determined by the management entity within the operating constraints of the established control loop;
    detecting the one or more criteria of the control loop that can be directly determined, and the identified different criteria that can be directly determined for the one or more criteria of the control loop that can not be directly determined; and adjusting a performance of the at least one managed entity relative to the defined target performance within the control loop, based upon the detected one or more criteria of the control loop and the identified different criteria.

16. A processor for use in a management entity for controlling an execution of at least one managed entity operating within a network, the processor comprising:

at least one controller coupled with at least one memory and configured to cause the processor to establish a control loop having a defined target performance value relative to the at least one managed entity, the control loop having one or more criteria associated with assessing the current performance of the at least one managed entity relative to the defined target performance value, where at least one of the one or more associated criteria can not be directly determined by the management entity within operating constraints of the established control loop;

the at least one controller is further configured to identify a translation for each of the at least one of the one or more associated criteria that can not be directly determined using one or more different criteria that can be directly determined by the management entity within the operating constraints of the established control loop;

the at least one controller is further configured to detect the one or more criteria of the control loop that can be directly determined, and the identified different criteria that can be directly determined for the one or more criteria of the control loop that can not be directly determined; and adjusting a performance of the at least one managed entity relative to the defined target performance within the control loop, based upon the detected one or more criteria of the control loop and the identified different criteria.

17. The processor in accordance with claim 16, wherein identifying the translation for each of the at least one of the one or more associated criteria that can not be directly determined includes accessing the associated information via a conveyance including the receipt of a performance status indication determined at an operational level that is different than an operational level of the control loop.

18. The processor in accordance with claim 17, wherein at least some of the different operational levels each correspond to different communication services or network slice instances.

19. The processor in accordance with claim 16, wherein when the at least one controller is identifying the translation for each of the at least one of the one or more associated criteria that can not be directly determined, if the translation includes a further criteria that can not be directly determined, the at least one controller is further configured to identify a further translation of the further criteria.

20. The processor in accordance with claim 19, wherein the identification of a translation is recursively applied until a proceeding identification of a translation does not produce any further criteria that can not be directly determined.

\* \* \* \* \*